June 2, 1953  V. W. FARRIS  2,640,675
MANUALLY OPERATED PINCH VALVE
Filed July 22, 1949

INVENTOR
VICTOR W. FARRIS
By Bernard H. Remlein
ATTORNEY

Patented June 2, 1953

2,640,675

UNITED STATES PATENT OFFICE 2,640,675

MANUALLY OPERATED PINCH VALVE

Victor Wallace Farris, Tenafly, N. J.

Application July 22, 1949, Serial No. 106,239

1 Claim. (Cl. 251—5)

This invention relates to valves, and more particularly, to that type of valve known as a pinch valve and comprising, in general, a flexible conduit, and means for pinching the walls of said conduit to control the flow of fluids therethrough.

The need has existed for some time for a valve of the general character indicated which is simple in construction and, therefore, inexpensive to fabricate and assemble, which is mechanically designed so as to be easily manually operated, and which is so mounted as to function efficiently without danger of binding.

Previous pinch valves have suffered by lacking in one or more of the foregoing and other desirable characteristics and it is to the provision of a valve which possesses these attributes that the present invention is addressed.

These, and other objects and advantages, which will become apparent as the hereinafter detailed description progresses, are attained in the present invention in the following manner.

In its broadest aspect, the present invention provides a flexible conduit, or, more specifically, a flexible conduit section adapted to be inserted in the line through which the flow of fluid is to be controlled, which flexible conduit is surrounded by a frame member having a portion thereof in contact with the exterior wall of said conduit. A clamping member engages the conduit at a point diametrically opposite the point of contact between said portion of said frame member and said conduit, and means, carried by the frame member and engaging the clamping member, are provided for moving said frame and clamping members relative to each other, thereby to pinch the flexible walls of the conduit and control the flow of fluid therethrough.

In one form of the present invention, the frame and clamping members are provided with means to prevent relative rotation therebetween, and said frame member is provided with means, cooperable with the conduit, for locating said frame with respect to said conduit and preventing relative rotation therebetween.

In the accompanying specification there shall be described and in the annexed drawings shown an illustrative embodiment of the present invention. It is, however, to be clearly understood that the present invention is not to be limited to the details herein shown and described for purposes of illustration only inasmuch as changes therein may be made without the exercise of invention and within the true spirit and scope of the claim hereto appended.

Figure 1:
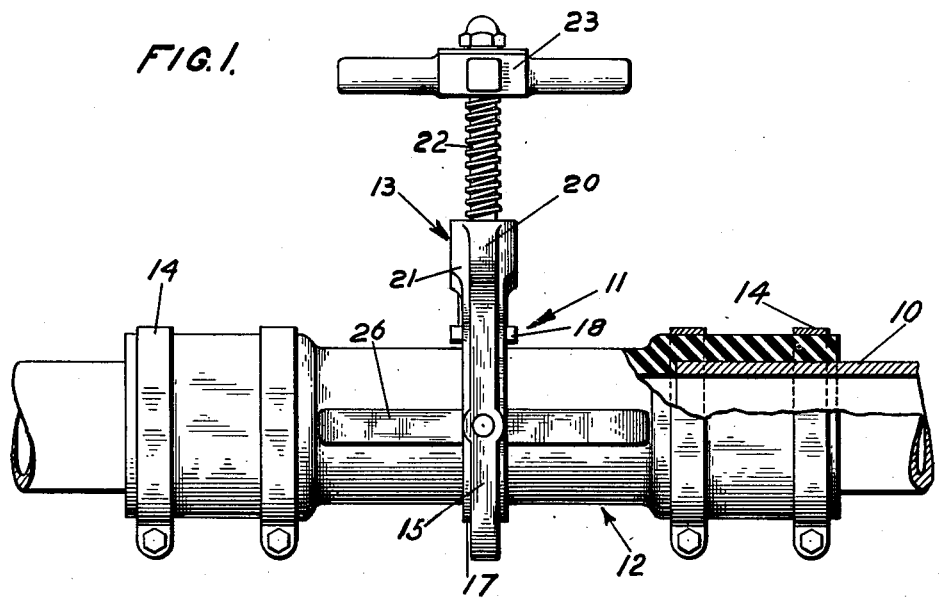
Figure 2:
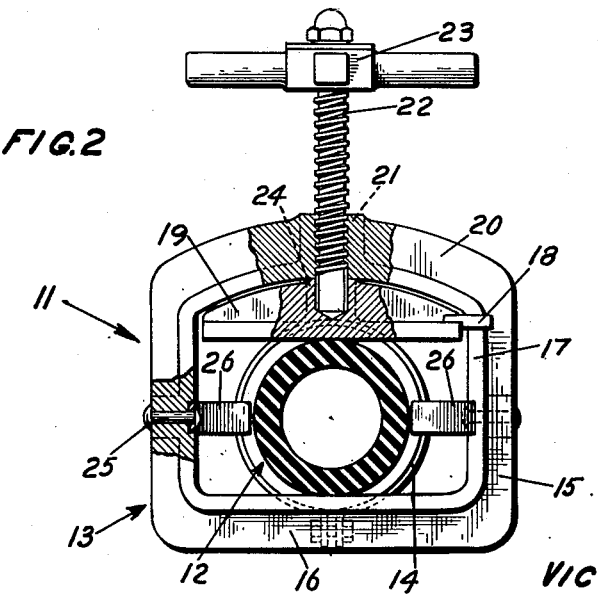

In said drawings,

Fig. 1 is a side elevational view of a conduit provided with one form of pinch valve assembled in accordance with the present invention, and Fig. 2 is a partial transverse sectional view of the same.

Referring now more in detail to the aforesaid illustrative embodiment of the present invention, with particular reference to Figs. 1 and 2 of the drawing, the numeral 10 designates a conduit through which it is desired to control the flow of fluid. For this purpose, said conduit is provided with a pinch valve generally designated by the reference character 11, said valve, in its broadest aspect, comprising a flexible section 12 the ends of which are provided with enlarged bore portions receptive of the adjacent ends of the conduit 10, and means 13 for pinching said flexible section and thereby controlling the flow of fluid therethrough. The section 12 is coupled to the conduit 10 by means of straps 14, and it is to be noted that the internal diameter of the main bore of the section 12 is of the same dimension as that of the conduit 10, thereby providing unimpeded flow of the fluid when the valve is open.

Surrounding the flexible conduit section 12 is a substantially rectangular frame member 15 one of the legs 16 of which abuts said section 12. The interior edge 17 of said frame member constitutes a guide engaged by a forked lug 18 formed on a clamping member 19 which is in contact with the conduit section 12 at a point diametrically opposite the point of contact between said conduit section and the leg 16 of the frame member. The engagement between the lug 18 and guide 17 serves the additional purpose of preventing relative rotation between the frame member 15 and the clamping member 19.

Another leg 20 of the frame member 15 has a threaded hub 21 formed thereon, said hub being receptive of a stem 22 the outer end of which is provided with an operating knob 23 and the inner end of which engages in a socket 24 formed in the clamping member 19.

Secured to the vertical legs of the frame member 15, as at 25, is a pair of bowed resilient straps 26, said straps having their outer free ends in yielding engagement with the conduit section 12 to locate the frame member 15 centrally along the length of said conduit section and to prevent relative rotation between said frame and conduit sections.

In operation, rotation of the stem 22 brings about relative longitudinal movement between the frame member 15 and the clamping member 19 to pinch the flexible conduit section 12, these members approaching each other during the closing of the valve and receding from each other during the opening of the valve.

This completes the description of the aforesaid illustrative embodiment of the present invention.

It will be noted from all of the foregoing that there has been provided a pinch valve which is simple and economical, capable of easy manual operation, and mounted in a manner assuring efficient functioning.

Other objects and advantages of the present invention will readily occur to those skilled in the art to which the same relates.

What is claimed is:

A valve comprising: a flexible conduit; a frame member surrounding said conduit and having a portion thereof in contact with said conduit; a clamping member engaging said conduit at a point diametrically opposite the point of contact between said portion of said frame member and said conduit; rotary means carried by said frame member with its axis of rotation perpendicular to the axis of said conduit and engaging said clamping member for moving said frame and clamping members relative to each other; and a bowed resilient member, supported at its center by said frame member, and extending on both sides of its point of support by said frame member, in a plane perpendicular to the axis of rotation of said rotary means, and including the axis of said conduit; the outer extremities of said bowed resilient member contacting said conduit to hold the same against relative rotation between said frame member and said conduit in said plane perpendicular to the axis of rotation of said rotary means.

VICTOR WALLACE FARRIS.

References Cited in the file of this patent

UNITED STATES PATENTS

| Number | Name | Date |
| --- | --- | --- |
| 582,027 | Smith | May 4, 1897 |
| 597,443 | Thomas | Jan. 18, 1898 |
| 1,432,882 | Lobl | Oct. 24, 1922 |
| 2,070,143 | Schisler | Feb. 9, 1937 |
| 2,183,835 | Foulke | Dec. 19, 1939 |
| 2,212,733 | Grigsby | Aug. 27, 1940 |
| 2,285,821 | Maloney | June 9, 1942 |

FOREIGN PATENTS

| Number | Country | Date |
| --- | --- | --- |
| 13,127 | Great Britain | of 1890 |
| 471,829 | Germany | of 1942 |